US012600905B2

(12) United States Patent
Schulte et al.

(10) Patent No.: US 12,600,905 B2
(45) Date of Patent: Apr. 14, 2026

(54) PROCESS FOR THE PREPARATION OF UP-CONVERSION PHOSPHORS

(71) Applicant: Evonik Operations GmbH, Essen (DE)

(72) Inventors: Simone Schulte, Essen (DE); Michael Huth, Maintal (DE); Stefan Fischer, Soest (DE); Christina Janke, Essen (DE); Juri Tschernjaew, Aschaffenburg (DE)

(73) Assignee: Evonik Operations GmbH, Essen (DE)

( * ) Notice: Subject to any disclaimer, the term of this patent is extended or adjusted under 35 U.S.C. 154(b) by 540 days.

(21) Appl. No.: 18/184,431

(22) Filed: Mar. 15, 2023

(65) Prior Publication Data

US 2023/0295495 A1    Sep. 21, 2023

(30) Foreign Application Priority Data

Mar. 17, 2022    (EP) ..................................... 22162614

(51) Int. Cl.
C09K 11/77 (2006.01)
C01B 33/32 (2006.01)

(52) U.S. Cl.
CPC ........ C09K 11/77062 (2021.01); C01B 33/32 (2013.01); *C01P 2002/52* (2013.01); *C01P 2006/60* (2013.01)

(58) Field of Classification Search
CPC .......................... C01B 33/32; C09K 11/77062
See application file for complete search history.

(56) References Cited

U.S. PATENT DOCUMENTS

| | | | |
|---|---|---|---|
| 8,597,789 B2 | 12/2013 | Schulz et al. | |
| 11,713,400 B2 | 8/2023 | Schulte et al. | |
| 2006/0108910 A1 | 5/2006 | Justel et al. | |
| 2009/0130169 A1 | 5/2009 | Bernstein | |
| 2011/0030578 A1 | 2/2011 | Schulz et al. | |
| 2021/0144994 A1 | 5/2021 | Winkler et al. | |
| 2021/0253889 A1 | 8/2021 | Schulte et al. | |

(Continued)

FOREIGN PATENT DOCUMENTS

| | | |
|---|---|---|
| DE | 10 2015 102 427 | 5/2016 |
| EP | 2 881 447 | 6/2015 |

(Continued)

OTHER PUBLICATIONS

Office Action received for U.S. Appl. No. 17/754,783, mailed on Apr. 22, 2025, 17 pages.

(Continued)

*Primary Examiner* — Peter F Godenschwager

(74) *Attorney, Agent, or Firm* — Grüneberg Global IP, PLLC

(57) ABSTRACT

A process can be used for the preparation of an up-conversion phosphor of the general formula (I):

$$A_{1-x-y-z}B^*_yB_2SiO_4{:}Ln^1_x,Ln^2_z,\qquad\text{(I).}$$

The process involves preparing a mixture, introducing the mixture into a reaction chamber of a thermal apparatus, heating the mixture until a thermal treatment temperature is reached with a heating ramp, thermally treating the heated mixture for a holding time of at least 0.02 h, cooling the thermally treated material to room temperature while maintaining a cooling ramp, and obtaining a silicate-based lanthanoid ion-doped phosphor according to formula (I).

20 Claims, 1 Drawing Sheet

Example 1 (Ca0.98Pr0.01Na0.01)L2SiO4 with 1.5% by weight of CaF2

(56)  References Cited

U.S. PATENT DOCUMENTS

| | | |
|---|---|---|
| 2021/0403753 A1 | 12/2021 | Schulte et al. |
| 2022/0041887 A1 | 2/2022 | Roland et al. |
| 2022/0325176 A1 | 10/2022 | Schulte et al. |
| 2022/0325177 A1 | 10/2022 | Schulte et al. |
| 2022/0403238 A1 | 12/2022 | Fischer et al. |
| 2022/0403239 A1 | 12/2022 | Fischer et al. |
| 2023/0295496 A1 | 9/2023 | Schulte et al. |

FOREIGN PATENT DOCUMENTS

| | | |
|---|---|---|
| EP | 3 929 254 | 12/2021 |
| JP | 2008-95091 | 4/2008 |
| WO | 2009/064845 | 5/2009 |
| WO | 2013/189699 | 12/2013 |
| WO | 2014/135353 | 9/2014 |
| WO | 2019/197076 | 10/2019 |
| WO | 2021/073915 | 4/2021 |
| WO | 2022/218662 | 10/2022 |
| WO | 2022/218663 | 10/2022 |

OTHER PUBLICATIONS

Extended European Search Report dated Sep. 5, 2022, in European Patent Application No. 22162614.6, 8 pages.

Jiang et al., "Preparation and luminescence properties of yellow long-lasting phosphor $Ca_2ZnSi_2O_7:Eu^{2+}, Dy^{3+}$", Materials Science and Engineering B, vol. 178, 2013, pp. 123-126.

U.S. Pat. No. 8,597,789, Dec. 3, 2013, 2011/0030578, Schulz et al.

U.S. Pat. No. 11,713,400, Aug. 1, 2023, 2021/0253889, Schulte et al.

U.S. Appl. No. 17/754,777, filed Apr. 12, 2022, Fischer et al.

U.S. Appl. No. 17/754,783, filed Apr. 12, 2022, Fischer et al.

U.S. Appl. No. 17/395,616, filed Aug. 6, 2021, Roland et al.

U.S. Appl. No. 17/355,385, filed Jun. 23, 2021, Schulte et al.

U.S. Appl. No. 17/658,681, filed Apr. 11, 2022, Schulte et al.

U.S. Appl. No. 17/658,664, filed Apr. 11, 2022, Schulte et al.

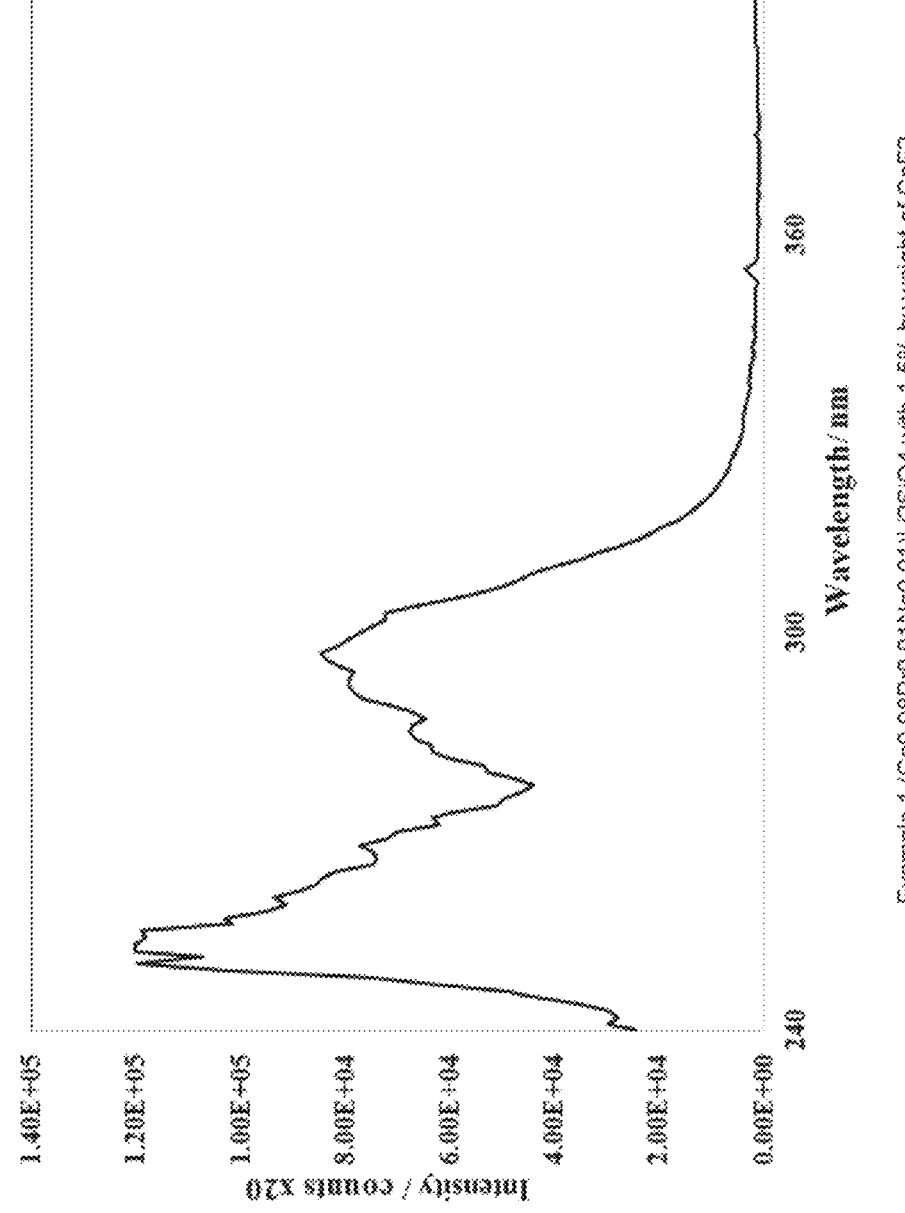

PROCESS FOR THE PREPARATION OF UP-CONVERSION PHOSPHORS

CROSS-REFERENCE TO RELATED APPLICATIONS

This application claims priority to European Application No. 22162614.6, filed on Mar. 17, 2022, the content of which is hereby incorporated by reference in its entirety.

BACKGROUND OF THE INVENTION

Field of the Invention

The invention relates to a process for the preparation of up-conversion phosphors.

Description of Related Art

Every day, humans are exposed to millions of microorganisms such as bacteria, fungi and viruses. Many of these microorganisms are useful or even necessary. Nevertheless, as well as these less harmful representatives, there are also disease-causing or even deadly bacteria, fungi and viruses.

Microorganisms can be transmitted through daily interaction with other people and contact with articles that have been used by others. Surfaces are given an antimicrobial finish especially in hygiene-sensitive areas. Fields of use are in particular surfaces of medical devices and consumer articles in hospitals, and in outpatient health and welfare facilities. In addition to these, there are surfaces in the public sphere, in the food and drink sector and in animal keeping. The spread of pathogenic microorganisms is a great problem nowadays in the care sector and in medicine, and wherever humans associate in an enclosed space. A particular risk at present is the increased occurrence of what are called multiresistant germs that have become insensitive to standard antibiotics.

In order to reduce the risk of spread of pathogens via contact surfaces, in addition to standard hygiene measures, antimicrobial technologies and materials are being utilized. Chemical substances or the use of physical methods can have a critical influence on the process of propagation of microorganisms. The physical methods include, for example, heat, cold, radiation or ultrasound, etc. Among the chemical methods, halogens, metal ions, organic compounds and dyes, toxic gases, etc., are known.

Even though chemical and physical methods are extremely effective in the destruction of microorganisms in most cases, they have only a short-lived effect, chemical methods promote the development of resistances and are unsuitable for some applications under some circumstances since they lead to destruction of the surfaces to be protected. The greatest disadvantage, however, specifically in the case of chemical organic substances, is the hazard or toxicity to man. Particular substances, for example formaldehyde, which found use as disinfectant for many years, are now suspected of causing cancer or of being extremely harmful to the environment.

Surfaces with antimicrobial action can make a crucial contribution to the solution of these problems. The standard processes nowadays for generation of such antimicrobial properties make use predominantly of active ingredients incorporated into the material, for example silver particles, copper particles, metal oxides thereof or quaternary ammonium compounds. This frequently involves processing the antimicrobial metals, metal oxides or metal oxide mixtures to give nanoparticles and then mixing them into paints, coatings or polymer materials. The broad use of metal particles is questionable since it is barely possible to assess the long-term effect of this heavy metal on man and the environment.

For example, WO 2019/197076 discloses particles finished with a layer containing both antimony tin oxide and manganese oxide. The person skilled in the art is aware that the antimicrobial surfaces are produced on account of the electrochemical characteristics of metals which, in the presence of moisture, develop microscale galvanic cells and, by virtue of the microscale electrical fields, germ-killing action.

It is likewise known that UV radiation can be used in medicine or in hygiene, in order, for example, to disinfect water, gases or surfaces. For instance, UV radiation has long been used in drinking water treatment to reduce the number of facultatively pathogenic microorganisms in the water. This is preferably done using UV-C radiation in the wavelength range between 200 nm and 280 nm. The use of electromagnetic radiation with different wavelengths should take account of the different absorption of the different proteins, the amino acids/nucleic acids (e.g. DNA or RNA) present in microorganisms, tissues or cells, and peptide bonds between the individual acids. For instance, DNA/RNA has good absorption of electromagnetic radiation in the wavelength range between 200 nm and 300 nm, and particularly good absorption between 250 nm and 280 nm, and so this radiation is particularly suitable for inactivation of DNA/RNA. It is thus possible to inactivate pathogenic microorganisms (viruses, bacteria, yeasts, moulds inter alia) with such irradiation. Depending on the duration and intensity of the irradiation, the structure of DNA or RNA can be destroyed. Thus, metabolically active cells are inactivated and/or their capacity for propagation can be eliminated. What is advantageous about irradiation with UV radiation is that the microorganisms are unable to develop resistance thereto. However, these physical methods require specific apparatuses and generally have to be repeated regularly by trained personnel, which makes it difficult for these methods to be used widely.

Furthermore, as well as direct irradiation with electromagnetic radiation from the wavelength range of UV radiation, the exploitation of the "up-conversion" effect is also known. This uses phosphor particles with which electromagnetic radiation having wavelengths above UV radiation, especially visible light or infrared radiation, can be converted to electromagnetic radiation having shorter wavelength, such that it is possible to achieve the emission of radiation having the desired wavelength by the individual phosphor particles.

DE 10 2015 102 427 relates to a body that emits electromagnetic radiation in the wavelength range of UV light. Phosphor particles are embedded in the body in a near-surface region within the material from which the body is formed or in a coating on the body. All that is stated here in general terms is that the phosphor particles are added directly to a coating to be formed on the material in the course of processing, where the particular material should have a suitable consistency or viscosity. DE 10 2015 102 427 is silent with regard to suitable polymers and additives.

US 2009/0130169 A1 and WO 2009/064845 A2 describe phosphors that can be introduced into polyvinyl chlorides, acryloylbutadienes, polyolefins, polycarbonates, polystyrenes or nylon, which kill pathogenic microorganisms by virtue of the up-conversion property of the phosphors. These are phosphors that are prepared at a temperature of 1800-2900° C. While US 2009/0130169 A1 and WO 2009/064845 A2 do disclose a composition comprising said phosphors having an asserted antimicrobial action, they do not demonstrate either evidence of the up-conversion property or microbiological experiments. The process disclosed in these documents does not result in a phosphor having an up-conversion property, but instead in an amorphous and glass-like product.

Moreover, US 2009/0130169 A1 and WO 2009/064845 A2 are silent as regards the compatibility of the component in the coating composition and the properties of the coating surfaces, such as the paint surfaces, for example. However, the appearance of coating surfaces is paramount for the consumer.

The demands on coatings and paints are diverse. In principle, coating layers or paint coatings have two tasks or functions: the protective and the decorative function. If merely the term "coating layer" should be stated below, both types of coating are intended. They decorate, protect and preserve materials such as wood, metal or plastic. Accordingly, bright and glossy coat layers are required on the one hand, and a continuous coat layer on the other hand for assurance of chemical and mechanical stability, a certain glide over the coatings or a particular feel.

In contrast to WO 2009/064845 A2, the patent application PCT/EP2020/077798 discloses phosphors exhibiting up-conversion and the preparation thereof. On irradiation with electromagnetic radiation having lower energy and longer wavelength in the range from 2000 nm to 400 nm, in particular in the range from 800 nm to 400 nm, such phosphors may emit electromagnetic radiation having higher energy and shorter wavelength in the range from 400 nm to 100 nm, preferably in the range from 300 nm to 200 nm, with the result that they are suitable for use as antimicrobial phosphors in coating layers.

For instance, EP 3 929 254 describes a composition comprising at least one film-forming polymer, at least one up-conversion phosphor according to the teaching of PCT/EP2020/077798, optionally at least one additive and optionally at least one curing agent. It was shown that coating layers comprising these phosphors have antimicrobial action without the other properties, in particular the storage stability, being significantly impaired.

However, it was also found that the phosphors prepared by a process according to PCT/EP2020/077798 exhibit an inhomogeneous particle size distribution, which presents a particular challenge when incorporating these phosphors into a coating matrix. Even though the teaching of EP 3929254 leads to antimicrobial coating layers, it would additionally be desirable to be able to increase the intensity of the emission of the phosphors.

The as-yet unpublished European patent application EP 21167984.0 proposed using, for the production of coatings having an antimicrobial property comprising at least one film-forming polymer,
optionally at least one additive,
optionally at least one curing agent,
at least one up-conversion phosphor with at most 3.5% by weight of flux, based on the overall amount of the reactants.

While all of the publications mentioned above and the as-yet unpublished European patent application EP 21167984.0 describe a process for the preparation of these up-conversion phosphors, these processes have been conducted only on the laboratory scale. This involved using agate mortars and muffle furnaces. The dimensions of such equipment are naturally limited. These processes can therefore not be used optimally for the industrial preparation of the up-conversion phosphors. The process regime is impractical and time- and cost-intensive. In addition, it has been found that the up-conversion phosphors prepared in relatively high amounts by these processes do not exhibit any reproducibility. Either the material did not display any sufficient up-conversion or the antimicrobial action was inadequate.

SUMMARY OF THE INVENTION

It was therefore an object of the present invention to specify an optimized process for the preparation of up-conversion phosphors.

To achieve this object, a process is proposed for the preparation of an up-conversion phosphor of the general formula (I)

$$A_{1-x-y-z}B^*_yB_2SiO_4{:}Ln^1_x,Ln^2_z,$$

with
$x=0.0001\text{-}0.0500$;
$z=0.0000$ or $z=0.0001$ to $0.3000$ with the proviso that:
$y=x+z$;
A being selected from the group consisting of Mg, Ca, Sr and Ba;
B being selected from the group consisting of Li, Na, K, Rb and Cs;
B* being selected from the group consisting of Li, Na and K, where B is the same as B* or B is not the same as B*, and preferably B and B* are not the same;
$Ln^1$ being selected from the group consisting of praseodymium (Pr), erbium (Er) and neodymium (Nd);
$Ln^2$ being selected from gadolinium (Gd),
comprising the following steps:
preparing a mixture with:
  i) at least one lanthanoid salt selected from lanthanoid nitrates, lanthanoid carbonates, a lanthanoid carboxylate, preferably lanthanoid acetates, a lanthanoid sulfate, and/or a lanthanoid oxide, preferably $Pr_6O_{11}$ and/or $Gd_2O_3$, where the lanthanoid ion in the lanthanoid oxide or lanthanoid salt is selected from praseodymium, gadolinium, erbium, neodymium and, for co-doping, preferably at least two of these,
  ii) providing a silicate, preferably a silicate salt, particularly preferably an alkali metal salt of the silicate, or a silicon dioxide,
  iii) providing at least one alkaline earth metal salt and at least one alkali metal salt, preferably an alkali metal silicate or an alkali metal carbonate, selected from a lithium salt or a lithium compound and optionally selected from a sodium salt and potassium salt, preferably the salt of the lithium salt, preferably a lithium silicate, particularly preferably a lithium carbonate, a calcium carbonate and a sodium carbonate, and optionally
  iv) at least one flux selected from the group of the ammonium halides, preferably ammonium chloride, alkali metal halides, preferably sodium chloride, sodium fluoride, sodium bromide, lithium fluoride or lithium chloride, alkaline earth metal halides, preferably calcium chloride or calcium fluoride, and lanthanoid halides, preferably praseodymium fluoride or praseodymium chloride,
introducing the mixture into a reaction chamber of a thermal apparatus,
heating the mixture until a thermal treatment temperature is reached of from 600° C. to <1000° C., preferably from 650° C. to 900° C., with a heating ramp of from 10° C./h-400° C./h, preferably 50° C./h-350° C./h, particularly preferably 80° C./h-300° C./h, thermally treating the heated mixture at a temperature of from 600° C. to <1000° C., preferably at 650° C. to 900° C., the holding time being at least 0.02 h, cooling the thermally treated material to room temperature while maintaining a cooling ramp of from 10° C./h-400° C./h, preferably 50° C./h-350° C./h, particularly preferably 80° C./h-300° C./h, obtaining a silicate-based lanthanoid ion-doped phosphor according to formula (I).

The invention also includes the following embodiments:

1. Process for the preparation of an up-conversion phosphor of the general formula (I)

$$A_{1-x-y-z}B^*_yB_2SiO_4:Ln^1_x,Ln^2_z,$$

with x=0.0001–0.0500;

z=0.0000 or z=0.0001 to 0.3000 with the proviso that: y=x+z;

A being selected from the group consisting of Mg, Ca, Sr and Ba;

B being selected from the group consisting of Li, Na, K, Rb and Cs;

B* being selected from the group consisting of Li, Na and K, where B is the same as B* or B is not the same as B*, and preferably B and B* are not the same;

$Ln^1$ being selected from the group consisting of praseodymium (Pr), erbium (Er) and neodymium (Nd);

$Ln^2$ being selected from gadolinium (Gd), comprising the following steps:

preparing a mixture with:

i) at least one lanthanoid salt selected from lanthanoid nitrates, lanthanoid carbonates, a lanthanoid carboxylate, preferably lanthanoid acetates, a lanthanoid sulfate, and/or a lanthanoid oxide, preferably $Pr_6O_{11}$ and/or $Gd_2O_3$, where the lanthanoid ion in the lanthanoid oxide or lanthanoid salt is selected from praseodymium, gadolinium, erbium, neodymium and, for co-doping, preferably at least two of these, ii) providing a silicate, preferably a silicate salt, particularly preferably an alkali metal salt of the silicate, or a silicon dioxide, iii) providing at least one alkaline earth metal salt and at least one alkali metal salt, preferably an alkali metal silicate or an alkali metal carbonate, selected from a lithium salt or a lithium compound and optionally selected from a sodium salt and potassium salt, preferably the salt of the lithium salt, preferably a lithium silicate, particularly preferably a lithium carbonate, a calcium carbonate and a sodium carbonate, and optionally iv) at least one flux selected from the group of the ammonium halides, preferably ammonium chloride, alkali metal halides, preferably sodium chloride, sodium fluoride, sodium bromide, lithium fluoride or lithium chloride, alkaline earth metal halides, preferably calcium chloride or calcium fluoride, and lanthanoid halides, preferably praseodymium fluoride or praseodymium chloride, introducing the mixture into a reaction chamber of a thermal apparatus, heating the mixture until a thermal treatment temperature is reached of from 600° C. to <1000° C., preferably from 650° C. to 900° C., with a heating ramp of from 10° C./h-400° C./h, preferably 50° C./h-350° C./h, particularly preferably 80° C./h-300° C./h, thermally treating the heated mixture at a temperature of from 600° C. to <1000° C., preferably at 650° C. to 900° C., the holding time being at least 0.02 h, cooling the thermally treated material to room temperature while maintaining a cooling ramp of from 10° C./h-400° C./h, preferably 50° C./h-350° C./h, particularly preferably 80° C./h-300° C./h, obtaining a silicate-based lanthanoid ion-doped phosphor according to formula (I).

2. Process according to embodiment 1, characterized in that the mixture is prepared without solvent.

3. Process according to either of the preceding embodiments, characterized in that the mixture is ground and/or compacted before being introduced into the reaction chamber.

4. Process according to any of the preceding embodiments, characterized in that at least 0.01%-10.0% by weight, preferably at least 0.5%-6.0% by weight and particularly preferably 1.5%-4.0% by weight, of flux is used, based on the overall amount of the reactants.

5. Process according to any of the preceding embodiments, characterized in that the thermal treatment is conducted batchwise or continuously.

6. Process according to any of the preceding embodiments, characterized in that the thermal apparatus is batchwise furnaces, preferably muffle furnaces, air circulation furnaces, chamber furnaces, trolley hearth furnaces or fluidized-bed furnaces, or continuous furnaces, preferably push-through furnaces, flow-through furnaces, rotary tube furnaces, drum furnaces, tunnel furnaces, vertical furnaces or paternoster furnaces.

7. Process according to any of the preceding embodiments, characterized in that when using rotary tube furnaces or drum furnaces it is necessary to heat the working tube or drum before introducing the mixture.

8. Process according to any of the preceding embodiments, characterized in that the thermal treatment is conducted under air atmosphere.

9. Process according to any of the preceding embodiments, characterized in that when using more than 1.0% by weight of lanthanoid ions, based on the overall amount of the reactants, prior to the cooling of the thermally treated material there is preferably conducted a further thermal treatment under reducing atmosphere at a temperature of from 600° C. to <1000° C., preferably at 650° C. to 900° C., with the holding time being at least 0.02 h, preferably at least 0.5 h, particularly preferably at least 3 h.

10. Process according to embodiment 9, characterized in that the reducing atmosphere is CO-containing atmospheres or a forming gas, preferably argon-hydrogen mixtures or nitrogen-hydrogen mixtures (97/3 and 95/5).

11. Process according to any of the preceding embodiments, characterized in that the lanthanoid is praseodymium.

12. Process according to any of the preceding embodiments, characterized in that the alkali metals are sodium or lithium.

13. Process according to any of the preceding embodiments, characterized in that the alkaline earth metal is calcium.

14. Process according to any of the preceding embodiments, characterized in that the phosphor has been doped with praseodymium.

15. Process according to any of the preceding embodiments, characterized in that the cooled silicate-based lanthanoid ion-doped phosphor is ground.

BRIEF DESCRIPTION OF THE DRAWING

The FIGURE shows an emission spectrum of the phosphor prepared by the process according to the invention.

DETAILED DESCRIPTION OF THE INVENTION

The term "thermal treatment" is understood here to mean calcination, precalcination, heat treatment, or thermal reduction.

With the process according to the invention, it is now possible, surprisingly, to prepare up-conversion phosphors in reproducible amounts.

What is advantageous with the process according to the invention is the preservation of the apparatus materials on account of the heating and cooling ramps. Apparatuses used therefore do not experience any sudden temperature stress that might lead to material fatigue.

Preferably, the holding time is 0.5 h, preferably 3 h, particularly preferably 6 h or 12 h, but no more than 48 h. A person skilled in the art can accordingly vary the holding time within these times for reasons of economics.

Preferably, the thermal treatment temperature is kept constant during the holding time.

The mixture can preferably be prepared by means of batchwise mixers, such as for example drum hoop mixers, drum roller mixers, double-cone mixers, container mixers, drum mixers, or continuous mixers such as for example paddle mixers, extruders, and flow mixers. Other mixers are also conceivable.

The mixture is preferably prepared without solvent.

Preferably, the mixture is ground and/or compacted before being introduced into the reaction chamber.

The uniformity of the mixture before introduction into the reaction chamber can play a large role in achieving the required product quality. In order to achieve this uniformity, grinding may preferably be used to make the particle size distribution of components i, ii, iii and optionally iv more uniform. The grinding may be effected by means of wet grinding or dry grinding. Dry grinding may for example be conducted in ball mills, stirred ball mills, pinned disc mills, impact mills, sifter mills, spiral jet mills, fluidized-bed jet mills or steam jet mills. Wet grinding may for example be conducted in rotor-stator dispersing systems/dispersers, stirred ball mills or colloid mills.

Subsequent compacting/granulation has the advantage of reducing the required working volume of the furnace, preventing or minimizing dust formation and/or counteracting demixing of the components. Compacting may be effected wet or dry. Compacted powder up to and including granules can be prepared by the compacting. Roller presses/compactors or similar technologies may be used for the compacting.

Preferably, at least 0.01%-10.0% by weight, preferably at least 0.5%-6.0% by weight and particularly preferably 1.5%-4.0% by weight, of flux is used, based on the overall amount of the reactants.

The thermal treatment is preferably conducted batchwise or continuously. Depending on the geometry of the thermal apparatuses, one such process regime is expedient, which the person skilled in the art can accordingly assess and employ.

The thermal apparatus is preferably batchwise furnaces, preferably muffle furnaces, air circulation furnaces, chamber furnaces, trolley hearth furnaces or fluidized-bed furnaces or reactor, or continuous furnaces, preferably push-through furnaces, flow-through furnaces, rotary tube furnaces, drum furnaces, tunnel furnaces, vertical furnaces or paternoster furnaces.

These furnaces can preferably be constructed gas-tight and/or gas-permeable, and may be operated electrically or with natural gas.

The furnace construction must preferably ensure that the process according to the invention, which consists essentially of heating, thermal treatment and cooling, can be conducted with adherence to the respective ramps and holding time.

When using rotary tube furnaces or drum furnaces, it is preferably for the working tube or drum to first be heated without mixture. Once the working tube has reached the necessary temperature, the mixture is introduced. On account of its construction, the holding times thereof can be short and correspondingly high throughputs can be generated. The cooling step of the invention with the cooling ramp may be dispensed with, since the product is immediately discharged into a vessel.

Preferably, the thermal treatment is conducted in a rotary tube furnace in combination with a further batchwise or continuous furnace, such as for example tunnel furnace, flow-through furnace, push plate furnace.

The thermal treatment is preferably conducted completely or partially under air atmosphere.

Should the process according to the invention be conducted in a reducing atmosphere, the thermal apparatus should preferably be gas-tight.

When conducted under air atmosphere, gas permeability of the thermal apparatus would be advantageous.

It is conceivable for the process according to the invention to preferably be conducted under air atmosphere and reducing atmosphere. The thermal apparatus should have such a combined unit for this purpose.

Preferably, the thermal apparatus in the reaction chamber has one or more vessels made from ceramics and/or provided with ceramic fillers and/or ceramic coatings. Vessels made of other materials which do not enter into any reactions with the reactants and/or the product may also be used. These vessels may be installed so as to be stationary or movable in the reaction chamber (for example: on a paternoster lift, on a carriage, on a continuous belt, etc.).

When using more than 1.0% by weight of lanthanoid ions, based on the overall amount of the reactants, prior to the cooling of the thermally treated material there is preferably conducted a further thermal treatment under reducing atmosphere at a temperature of from 600° C. to <1000° C., preferably at 650° C. to 900° C., with the holding time being at least 0.02 h, preferably at least 0.5 h, particularly preferably at least 3 h.

The reducing atmosphere is preferably CO-containing atmospheres or a forming gas, preferably argon-hydrogen mixtures or nitrogen-hydrogen mixtures (97/3 and 95/5).

For the process according to the invention, the lanthanoids are preferably praseodymium, the alkali metals are preferably sodium or lithium and the alkaline earth metals are preferably calcium.

Preferred silicon dioxides that may be used are the products with the trade names Aerosil® 300, 200, OX50, 200V and 300V from Evonik.

Preferably, the phosphor prepared by the process according to the invention is doped with praseodymium.

Preferably, the cooled silicate-based lanthanoid ion-doped phosphor is ground.

The phosphors prepared by the process according to the invention can be coated by an aftertreatment. Coated and uncoated up-conversion phosphors can be used in coating materials having antimicrobial action.

Adduced hereinafter are examples that serve solely to elucidate this invention to the person skilled in the art and do not constitute any restriction at all of the subject-matter as described.

Methods

Particle size distribution to ISO 13320:2020 and USP 429, with a Horiba LA-950 Laser Particle Size Analyzer Qualitative elemental analysis by means of EDX with a Tabletop 4000Plus from Hitachi, kV BSE detector, 1000× magnification Powder XRD: The X-ray powder diffractograms of the samples were recorded using a Bruker D2 Phaser powder diffractometer operating in Bragg-Brentano geometry, using $Cu$—$K_\alpha$ radiation and a line scan CCD detector. The integration time was 20 s and the step width was 0.017° 2θ.

The emission spectra were recorded with the aid of an Edinburgh Instruments FLS920 spectrometer equipped with a 488 nm continuous-wave OBIS laser from Coherent and a Peltier-cooled (−20° C.) single-photon counting photomultiplier from Hamamatsu (R2658P). Edge filters were used to suppress second- and higher-order reflections caused by the monochromators.

BET surface area measurements to ISO 9277:2010, DIN 66131 using a Nova 2000e instrument from Quantachrome.

The degree of crystallinity (DOC) gives information on the ratio of the crystalline area to the amorphous area of all components in a powder diffractogram. The degree of crystallinity is calculated from the total area under the crystalline and amorphous fractions:

$$DOC = \frac{\text{Crystalline area}}{\text{Crystalline area} + \text{Amorphous area}}$$

Bulk and tamped density measurement to DIN EN ISO 787-11:1995-10.

Example Preparation of a Phosphor $(Ca_{0.98}Pr_{0.01}Na_{0.01})Li_2SiO_4$ with 1.5% by Weight Of $CaF_2$ as Flux on a 6 kg Scale in Accordance with the Process According to the Invention 2.47 kg of $CaCO_3$, 1.86 kg of $Li_2CO_3$, 1.51 kg of $SiO_2$, 13.36 g of $Na_2CO_3$, 42.95 g of $Pr_6O_{11}$, and 92.62 g of $CaF_2$ were mixed in a drum hoop mixer and ground by means of a pinned disc mill. The ground mixture was then compacted using a roller compactor. The ground and compacted mixture was distributed between three 3.2 I ceramic boxes. Each box was filled with 2 kg of the mixture. The boxes were then transferred into a chamber furnace. The filled boxes (batch) were heated to a temperature of 850° C. with a heating ramp of 90° C./h. When the thermal treatment temperature of 850° C. was reached, the batch was calcined in air for 6 h. The phosphor was then cooled to room temperature while maintaining a cooling ramp of 90° C./h. The cooled, coarse material-like phosphor could be removed from the boxes and pre-comminuted by means of a jaw crusher. The pre-comminuted phosphor was ground to a particle size distribution of $D_{10}$: 2.6 μm $D_{50}$: 3.6 μm $D_{90}$: 6 μm with an air jet mill.

With a batch of 6 kg of reactants, a yield of 4.8 kg of phosphors could be prepared.

The FIGURE shows an emission spectrum of the phosphor prepared by the process according to the invention.

The phosphor prepared by the process according to the invention exhibited an up-conversion property in the emission spectrum in the UV-C range and an antimicrobial action.

Theoretical Comparative Example 1 (CE1) Preparation of a Phosphor in Accordance with the as-Yet Unpublished European Patent Application EP 21167984.0 $(Ca_{0.98}Pr_{0.01}Na_{0.01})Li_2SiO_4$ with 1.5% by Weight of $CaF_2$ as Flux For a batch of 6 kg of reactants, a theoretical 600 crucibles have to be prepared and 200 muffle furnaces have to be present, in order to be able to conduct the process. This calculation was based on the holding capacity of a muffle furnace. In theory, three 60 ml ceramic crucibles fit in a muffle furnace, each of these crucibles being able to hold 10 g of reactant mixture. In view of this calculation, it is clear that the process known from the prior art could not be economically practicable.

Comparative Example 2 (CE2): Preparation of a Phosphor $(Ca_{0.98}Pr_{0.01}Na_{0.01})Li_2SiO_4$ with 1.5% by Weight of $CaF_2$ as Flux on a 6 kg Scale without Heating Ramp and without Cooling Ramp Analogously to the example described above, the reactants were mixed and distributed between the 3.2 I ceramic boxes. However, the heating ramp was dispensed with. It could be seen that all ceramic boxes broke. After the thermal treatment, the phosphor was cooled to room temperature without maintaining the cooling ramp. Damaged ceramic boxes were irreparably broken. A yield of 0 kg of phosphor was obtained. The phosphors contaminated with ceramic material were disposed of.

The invention claimed is:

1. A process for the preparation of an up-conversion phosphor of the general formula (I)

$$A_{1-x-y-z}B^*_yB_2SiO_4{:}Ln^1_x,Ln^2_z, \qquad (I)$$

wherein x=0.0001-0.0500;

z=0.0000 or z=0.0001 to 0.3000, with the proviso that y=x+z;

A is selected from the group consisting of Mg, Ca, Sr, and Ba;

B is selected from the group consisting of Li, Na, K, Rb, and Cs;

B* is selected from the group consisting of Li, Na, and K;

$Ln^1$ is selected from the group consisting of praseodymium (Pr), erbium (Er), and neodymium (Nd); and $Ln^2$ is gadolinium (Gd), the process comprising:

preparing a mixture with:

i) at least one of a lanthanoid salt selected from the group consisting of a lanthanoid nitrate, a lanthanoid carbonate, a lanthanoid carboxylate, and a lanthanoid sulfate and combinations thereof; and/or a lanthanoid oxide, wherein a lanthanoid ion in the lanthanoid oxide or lanthanoid salt is selected from the group consisting of praseodymium, gadolinium, erbium, and neodymium and combinations thereof, ii) a silicate or a silicon dioxide, iii) at least one alkaline earth metal salt, and at least one alkali metal salt including a lithium salt and/or a lithium compound, and optionally further including a sodium salt and/or a potassium salt, and optionally iv) at least one flux selected from the group consisting of ammonium halide, alkali metal halide, alkaline earth metal halide, and lanthanoid halide, introducing the mixture into a reaction chamber of a thermal apparatus, heating the mixture until a thermal treatment temperature is reached of from 600° C. to <1000° C., with a heating ramp of from 10° C./h-400° C./h, to obtain a heated mixture, thermally treating the heated mixture at a temperature of from 600° C. to <1000° C., with a holding time of at least 0.02 h, to obtain a thermally treated material, cooling the thermally treated material to room temperature while maintaining a cooling ramp of from 10° C./h-400° C./h, and obtaining a silicate-based lanthanoid ion-doped phosphor according to the general formula (I).

2. The process according to claim 1, wherein the mixture is prepared without solvent.

3. The process according to claim 1, wherein the mixture is ground and/or compacted before being introduced into the reaction chamber.

4. The process according to claim 1, wherein the mixture comprises at least 0.01%-10.0% by weight of the at least one flux.

5. The process according to claim 4, wherein the mixture comprises 1.5%-4.0% by weight of the at least one flux.

6. The process according to claim 1, wherein the thermal treatment is conducted batchwise or continuously.

7. The process according to claim 1, wherein the thermal apparatus is a batchwise furnace or a continuous furnace.

8. The process according to claim 7, wherein the thermal apparatus is a muffle furnace, air circulation furnace, chamber furnace, trolley hearth furnace, fluidized-bed furnace, push-through furnace, flow-through furnace, rotary tube furnace, drum furnace, tunnel furnace, vertical furnace, or paternoster furnace.

9. The process according to claim 1, wherein when the thermal apparatus is a rotary tube furnace or a drum furnace, a working tube or drum is heated before introducing the mixture.

10. The process according to claim 1, wherein the thermal treatment is conducted under air atmosphere.

11. The process according to claim 1, wherein when the mixture comprises more than 1.0% by weight of said lanthanoid ion, prior to the cooling of the thermally treated material, a further thermal treatment is conducted under a reducing atmosphere at a temperature of from 600° C. to <1000° C., with a holding time of at least 0.02 h.

12. The process according to claim 11, wherein the reducing atmosphere is a CO-containing atmosphere or a forming gas.

13. The process according to claim 1, wherein the lanthanoid ion is praseodymium.

14. The process according to claim 1, wherein alkali metals of the at least one alkali metal salt are sodium and/or lithium.

15. The process according to claim 1, wherein an alkaline earth metal of the at least one alkaline earth metal salt is calcium.

16. The process according to claim 1, wherein the silicate-based lanthanoid ion-doped phosphor according to the general formula (I) is doped with praseodymium.

17. The process according to claim 1, wherein the silicate-based lanthanoid ion-doped phosphor according to the general formula (I) is ground.

18. The process according to claim 1, wherein the lanthanoid oxide is $Pr_6O_{11}$ and/or $Gd_2O_3$.

19. The process according to claim 1, wherein the at least one alkaline earth metal salt is calcium carbonate, and the at least one alkali metal salt is lithium carbonate and sodium carbonate.

20. The process according to claim 1, wherein the mixture comprises the at least one flux, and the at least one flux is selected from the group consisting of ammonium chloride, sodium chloride, sodium fluoride, sodium bromide, lithium fluoride, lithium chloride, calcium chloride, calcium fluoride, praseodymium fluoride, and praseodymium chloride.

* * * * *